United States Patent [19]

Yoshikawa et al.

[11] Patent Number: 4,753,047

[45] Date of Patent: Jun. 28, 1988

[54] TRANSFERRING AND LOADING DEVICE FOR HONEYCOMB STRUCTURES

[75] Inventors: Akira Yoshikawa; Akira Nishio, both of Nagoya, Japan

[73] Assignee: NGK Insulators, Ltd., Japan

[21] Appl. No.: 835,390

[22] Filed: Mar. 3, 1986

[30] Foreign Application Priority Data

Mar. 20, 1985 [JP] Japan .................................. 60-54168

[51] Int. Cl.$^4$ ............................................. B24B 41/06
[52] U.S. Cl. ................................ 51/215 HM; 51/235; 51/237 T; 51/134
[58] Field of Search ...................... 51/134, 273, 108 R, 51/235, 237 T, 215 HM, 215 H; 269/11

[56] References Cited

U.S. PATENT DOCUMENTS

| | | | |
|---|---|---|---|
| 1,361,883 | 12/1920 | Littman | 51/215 HM |
| 2,444,531 | 7/1948 | Richardson | 51/235 |
| 2,587,271 | 2/1952 | Allen et al. | 51/145 T |
| 3,601,264 | 8/1971 | Ritter, Jr. | |
| 3,857,205 | 12/1974 | Van Hove | 51/134 |

FOREIGN PATENT DOCUMENTS 3308738 9/1983 Fed. Rep. of Germany.

Primary Examiner—Frederick R. Schmidt
Assistant Examiner—Robert A. Rose
Attorney, Agent, or Firm—Parkhurst & Oliff

[57] ABSTRACT

A transferring and loading device for honeycomb structures including a movable hollow arm having a suction duct communicating with suction means, a perforated plate secured to an end of the movable hollow arm, and movable arm driving means for rotating said movable arm. The honeycomb structure clings thereto by sucking atmospheric air into the suction duct through passages of the honeycomb structure and the perforated plate and attracting the honeycomb structure to the perforated plate by means of the suction means having exhaust capacity larger than the suction of atmospheric air. In this manner, the device can rapidly handle the honeycomb structures without applying any undue force to the honeycomb structures and at the same time can remove the dust and ground chips produced in previous grinding process without using any dust collector.

4 Claims, 6 Drawing Sheets

FIG_1

FIG_2

FIG_4

FIG_5

TRANSFERRING AND LOADING DEVICE FOR HONEYCOMB STRUCTURES

BACKGROUND OF THE INVENTION

This invention relates to a transferring and loading device for honeycomb structures for transferring and loading them for a next process by attraction with the aid of suction force caused by air suction.

In transferring ceramic honeycomb structure products (referred to hereinafter simply "honeycomb structures") from one process to another of manufacture, the transferring and loading operations in the past have been performed manually by workers. This results from the fact that such a manual operation must be performed with great precaution in order to avoid applying a large force or shock to the honeycomb structure, because the ceramic material is brittle. Although the honeycomb structure is hard, it does have thin walls which may be easily damaged. Moreover, the above is more acute in green honeycomb structures.

However, the above manual operation for transferring and loading the honeycomb structures greatly lowers working efficiency and is not suitable for mass-production. Moreover, such a manual operation is likely prone to damage the honeycomb structure and therefore tends to lower the yield rate of manufacturing the honeycomb structures.

In order to automate the operation, it is considered to use a device having jaws for gripping a honeycomb structure. However, such a device is not preferable because it is difficult, if not impossible, to control gripping forces to avoid damage of the honeycomb structure.

SUMMARY OF THE INVENTION

It is a principal objective of the invention to provide an improved transferring and loading device for honeycomb structures, which completely eliminates the disadvantages of the prior art.

In order to achieve this objective, a transferring and loading device for honeycomb structures according to the invention comprises a movable hollow arm having a suction duct communicating with suction means, a perforated plate secured to an end of the movable hollow arm, which clings the honeycomb structure by contacting on open end of the honeycomb structure, and movable arm driving means for rotating the movable arm. The device operates by sucking atmospheric air into the suction duct through passages of the honeycomb structure and the perforated plate, thereby attracting the honeycomb structure to the perforated plate using the suction means, which has an exhaust capacity larger than the suction of atmospheric air.

With this device, the honeycomb structure is attracted to the perforated attracting plate sufficiently to rapidly transfer and load it onto a next station without applying undue force to the honeycomb structure, thereby enabling the honeycomb structures to be produced in mass-production and improving the yield rate.

In order that the invention may be more clearly understood, preferred embodiments will be described, by way of example, with reference to the accompanying drawings.

DESCRIPTION OF THE PREFERRED EMBODIMENTS

Figure 1:
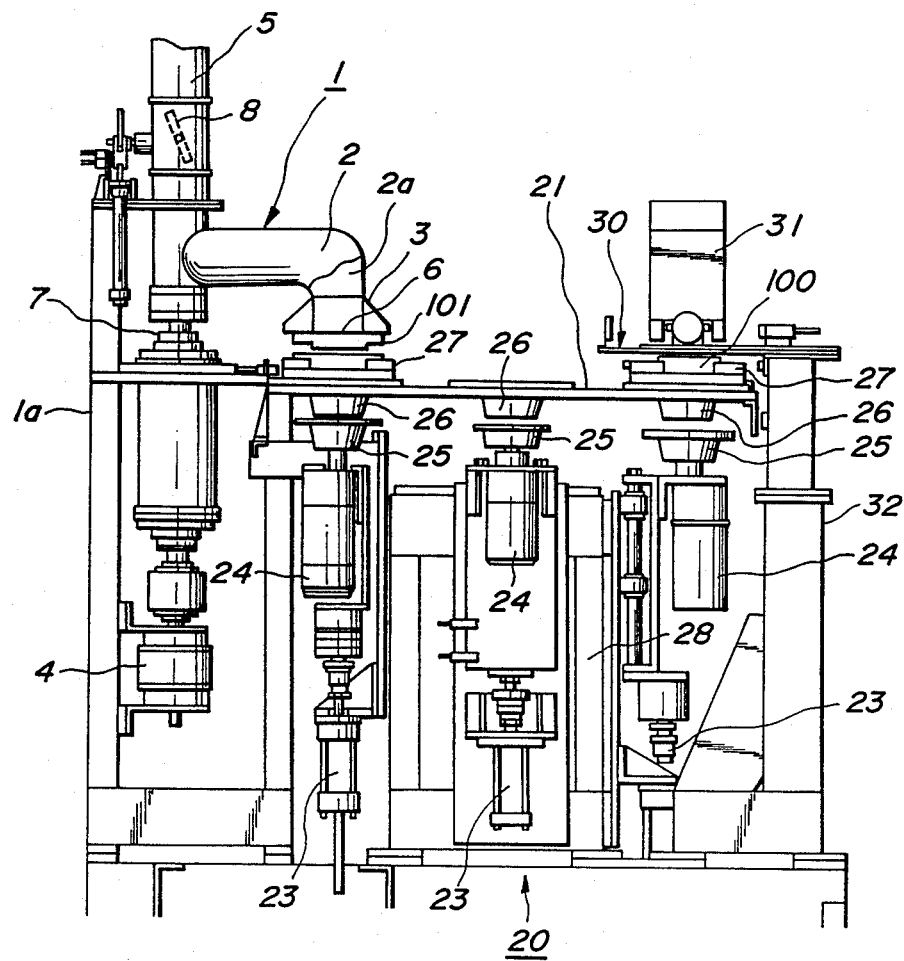
FIG. 1 is a front elevation of one embodiment of the device according to the invention including an end surface grinding machine.

FIG. 1 illustrates an apparatus of one embodiment of the invention. The transferring and loading device 1 is arranged on a side of a grinding device 20, which grinds ends of honeycomb structures 100, for transferring the ground honeycomb structures and loading them onto a next station. Such honeycomb structures which have been ground will be referred to herein as "ground honeycomb structures".

A frame 1a rotatably supports a vertical duct 5 having a movable arm 2 horizontally extending from a side surface of a lower end of the vertical duct 5. A front end of the movable arm 2 is perpendicularly bent downward and its lower end is provided with a suction port 3 which diverges downward in the form of a cone. The movable arm is hollow to form a suction duct 2a communicating the suction port 3 with the vertical duct 5. A wire 6 made of a comparatively hard metal is flat secured to a lower end of the suction port 3.

A lower end of the vertical duct 5 is mounted on a shaft 7 adapted to be rotated by a rotary actuator 4 so that the vertical duct 5 is rotated by the rotating action of the rotary actuator 4. When the vertical duct 5 is rotated, the movable arm is rotated in a horizontal plane.

The vertical duct 5 communicates with a dust collector (not shown), and negative suction pressure prevails in the vertical duct resulting from the action of the dust collector. A damper 8 is provided in a mid portion of the vertical duct 5 for shutting off the air flow passing therethrough.

Figure 2:
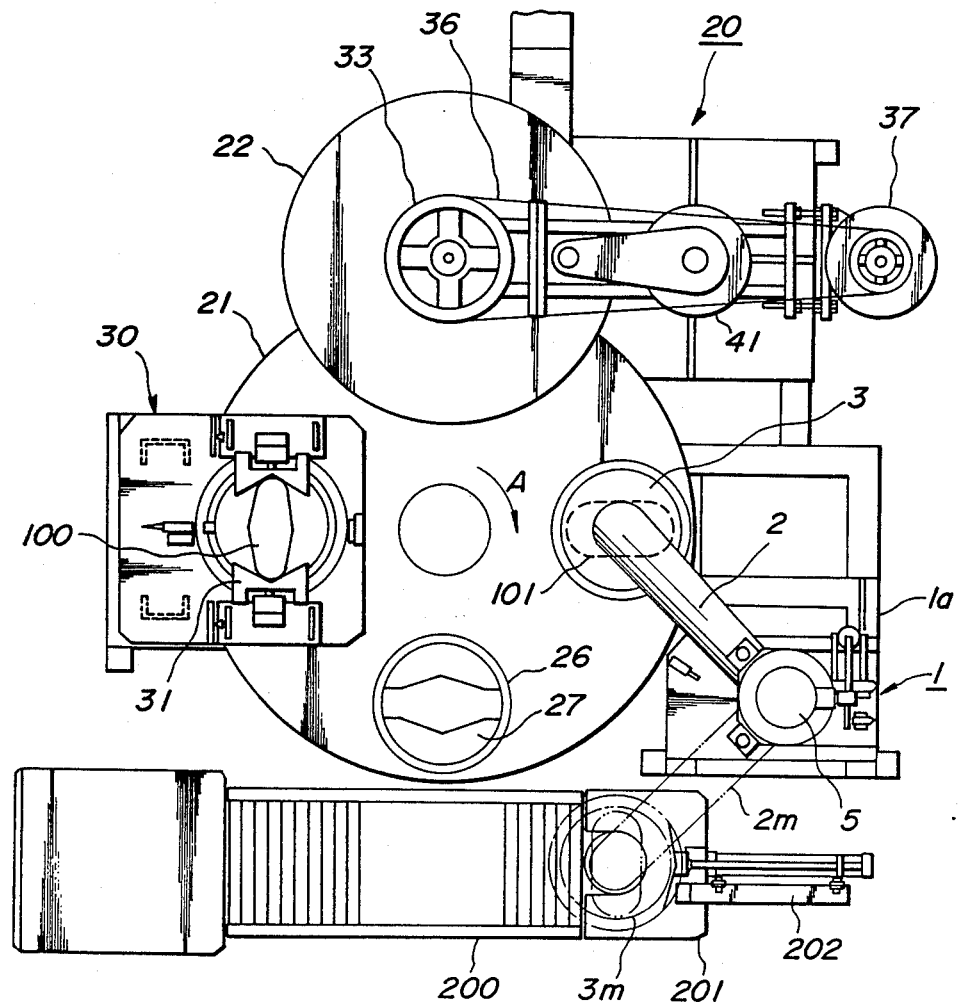
FIG. 2 is a plan view of the device shown in FIG. 1.

FIG. 2 is a plan view of the transferring and loading device of this embodiment. The suction port 3 is movable between a periphery of a turntable 21 of the grinding device 20 and a position above a receiving base 201 of a conveyor 200 arranged beside the grinding device 20. In this embodiment, the rotary actuator enables the vertical duct 5 to be rotated within a range of 90°. Accordingly, the movable arm 2 is movable from the position shown by solid lines to that shown by phantom lines 2m, so that the suction port 3 is moved from the position above the periphery of the turntable 21 to that immediately above the receiving base 201 as shown in phantom lines 3m.

The operation of the device of this embodiment will be explained hereinafter. The turntable 21 is turned in a direction shown by an arrow A in increments of 90° with a predetermined interval. In this manner, ground honeycomb structures 101 whose upper end surfaces have been ground by a grinding wheel 22 are transferred to a position immediately below the suction port 3 of the transferring and loading device 1 poised for the ground honeycomb structure.

The ground honeycomb structures 101 are seated on bases 26 on the turntable 21. When each base 26 is stopped, a cup 25 located below the stopped base 26 is raised by a cup raising cylinder 23, so that the ground honeycomb structure together with the base 26 is raised. Thus, the ground honeycomb structure 101 abuts against the metal wire 6 of the suction port 3 poised thereabove. At this moment, the damper 8 is opened to cause negative pressure in the suction port 3, so that the ground honeycomb structure clings to the metal wire by the suction of the negative force.

Figure 3:
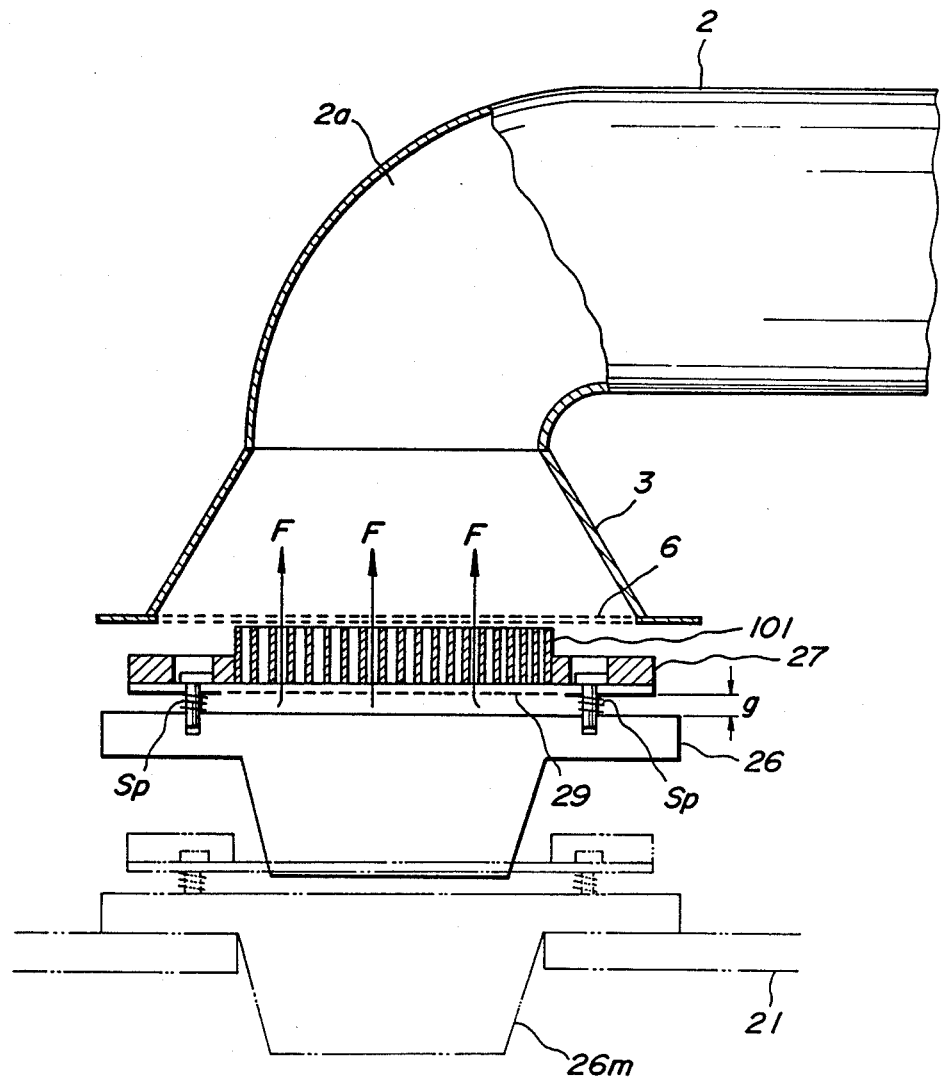
FIG. 3 is an enlarged sectional view of a movable arm of the device shown in FIG. 1.

FIG. 3 illustrates this condition on an enlarged scale. The upper surface of the ground honeycomb structure abuts against the metal wire 6 and the lower surface is in contact with a bottom of a chuck arranged on the base 26. The bottom of the chuck 27 is formed by a perforated plate 29 having a great number of apertures as a punched metal plate. Between the perforated plate 29 and the base 26 there is a gap or clearance g which is held by a plurality of springs $S_p$ interposed therebetween.

As cells forming the honeycomb structure 101 extend vertically as shown in FIG. 3, atmospheric air F flows through the gap g and the cells into the suction port 3. Such an air flow simultaneously sucks dust or chips which would cover the upper surface of the base 26 and the inside and upper surface of the ground honeycomb structure 101, thereby performing a dust collecting action.

After the time has elapsed sufficiently to remove the dust on the base 26, the cup raising cylinder 23 is driven in the reverse direction to lower the cup 25, so that the base 26 is returned onto the turntable as shown in phantom lines 26m. During these operations, the ground honeycomb structure 101 remains clinging to the metal wire 6 of the suction port 3. Thereafter, the suction port 3 moves above the receiving base 201 of the conveyor 200 together with the honeycomb structure 101 clinging to th metal wire by the turning of the movable arm 2 through 90'.

Then, the air passage of the vertical duct 5 is shut off by the damper 8, so that the ground honeycomb structure 101 which has clung to the suction port 3 is released and drops through a very slight distance onto the receiving base 201.

Thereafter, the movable arm 2 is rotated toward the turntable 21 through 90° and is poised for a next ground honeycomb structure 101 to be positioned below the suction port 3.

Moreover, the ground honeycomb structure 101 loaded on the receiving base 201 is pushed onto the conveyor 200 by a pusher 202 provided behind the receiving base 201 and then transferred to a next station for a next process.

In this manner, the transferring and loading apparatus 1 rapidly performs the transferring and loading of the ground honeycomb structure 101 while it clings to the suction port 3 by means of suction force caused by sucking the atmospheric air without any undue force acting upon the honeycomb structure.

In sucking the air, the dust or chips produced in grinding the end surfaces of the honeycomb structures can be removed simultaneously, thereby preventing the grinding chips from scattering about the honeycomb structure manufacturing apparatus.

The grinding the device 20 for grinding end surfaces of honeycomb structures shown in FIG. 1 will be explained, although it is not essential for constituting the invention.

Figure 4:
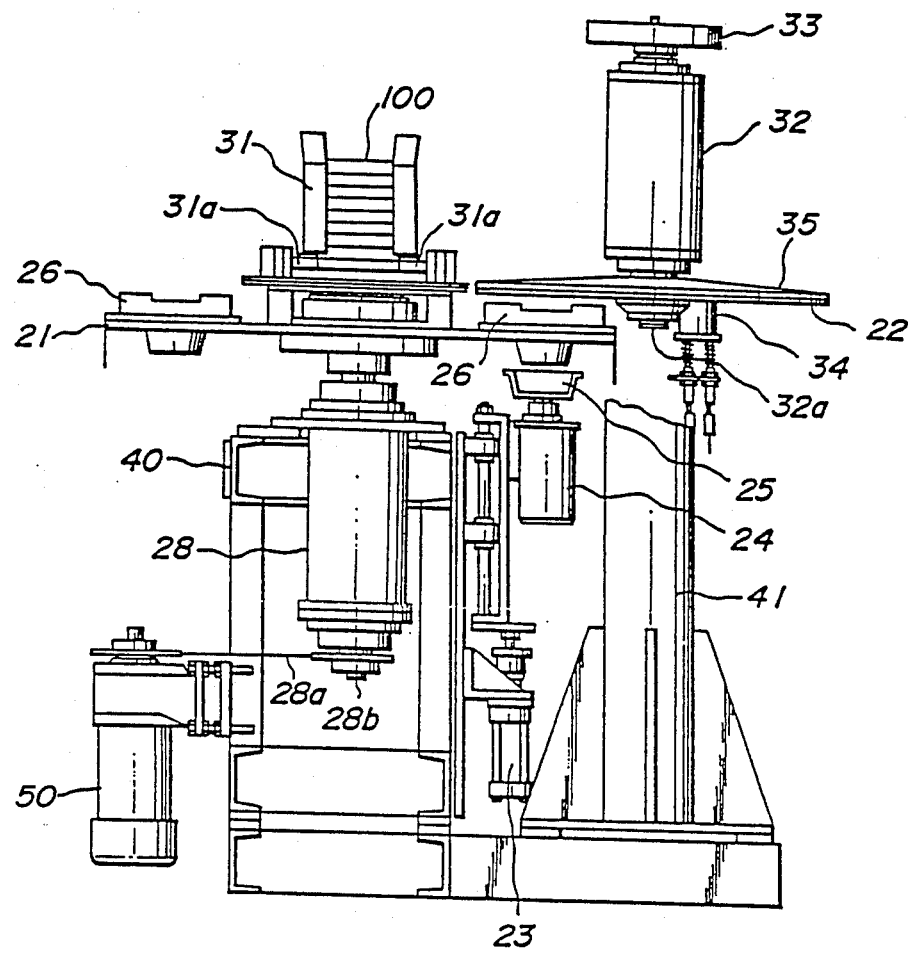
FIG. 4 is a side view of the grinding device viewed from the left in FIG. 1.

As above described, the four bases 26 detachably arranged equally angularly spaced on the turntable 21 which is in turn supported on a turntable rotating bearing 28 as shown in FIG. 4. The turntable rotating bearing 28 supports a turntable rotating shaft 28b adapted to be rotated through a chain 28a by a turntable rotating motor 50 fixed to a frame 40.

As above described, the turntable 21 repeats the rotations of 90° and stops with predetermined intervals, and below the stopped base 26 there are provided the cup 25 and the cup raising cylinder 23 for raising the base 26 and a motor 24 for rotating the cup 25.

Moreover, a supply station 30 is arranged at diametrically 180° opposed position with respect to the stopped position of the base 26 where the honeycomb structure clings to the suction port 3. The grinding wheel 22 is arranged at a stopped position of the base 26 which has been rotated through 90° from the position of the supply station 30.

The supply station 30 is a device for loading unground honeycomb structures one by one onto the bases 26 and is provided with a stocker for holding a plurality of honeycomb structures 100 in a laminated condition. For this purpose, the lowermost honeycomb structure 100 is embraced by two stoppers 31a (FIG. 4).

The operation of the supply station 30 for loading the honeycomb structures 100 one by one onto the bases 26 is performed in the following manner.

First, when the turntable 21 is turned to feed a base 26 devoid of the honeycomb structure to a position immediately below the stocker, the cup raising cylinder 23 arranged below the base 26 is actuated to raise the cup 25 together with the base 26. By the raising of the base 26, an upper surface of the chuck 27 arranged on the base 26 abuts against a lower surface of the stocker 31 to open stoppers 31a, with the result that the honeycomb structures 100 stacked in the stocker 31 fall in unison through a slight distance corresponding to a thickness of one structure so as to accommodate the lowermost honeycomb structure into the chuck 27. Thereafter, the stoppers 31a are again closed, and these closed stoppers embrace the honeycomb structure located immediately above the honeycomb structure now located in the chuck.

Thereafter, the cup 25 is lowered and the base 26 is returned onto the turntable 21. In this manner, one honeycomb structure 100 accommodated in the chuck 27 is arranged on the base 26. The base 26 supporting one honeycomb structure is then fed to a position below the grinding wheel 22 by the rotation of the turntable 21 through 90°.

The grinding wheel 22 is a disc-like wheel for grinding a flat surface and is fixed together with a grinding wheel guide 35 to a lower end of a grinding wheel rotating shaft 32a supported in a grinding wheel rotating bearing 32 as shown in FIG. 4. The grinding wheel guide 35 is a disc having a diameter substantially equal to that of the grinding wheel 22 and serves to prevent the grinding wheel 22 from being broken and to press the wheel 22 against a honeycomb structure.

The grinding wheel rotating bearing 32 is supported by a column 41 and supports the grinding wheel rotating shaft 32a provided at its upper end with a pulley 33 which is rotatively driven through a V-belt 36 by means of a grinding wheel rotating motor 37 mounted on the column 41. In this manner, the grinding wheel 22 always rotates at high speeds (for example, 50-750 rpm).

The grinding of the end surface (upper surface) of the honeycomb structure 100 is performed in the following manner. When a base 26 is fed into a position below the grinding wheel 22 together with a honeycomb structure 100 which has not been ground and is held by the stocker 31 by the rotation of the turntable 21, the cup 25 located below the base 26 is raised upward by the action of the cup raising cylinder 23.

Figure 5:
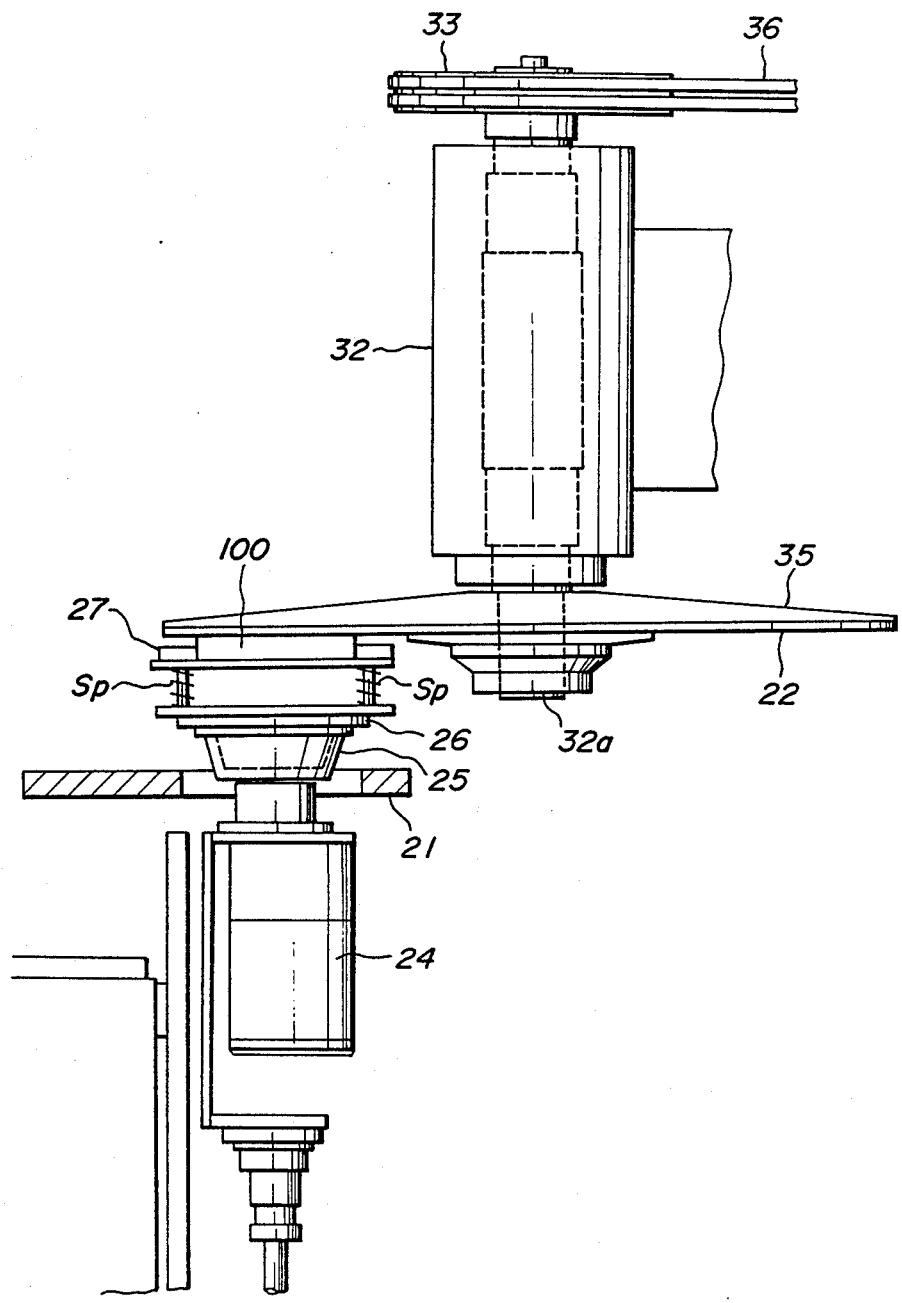
FIG. 5 is an enlarged view of a grinding wheel of the grinding device shown in FIG. 4.

As the result, the upper surface of the honeycomb structure 100 abuts against the grinding wheel 22 to start the grinding operation as shown in FIG. 5. On starting the grinding operation, the cup rotating motor 24 located below the cup 25 is energized to rotate the cup 25 in a horizontal plane. The rotating direction of the cup 25 is opposite to that of the grinding wheel 22.

Figure 6:
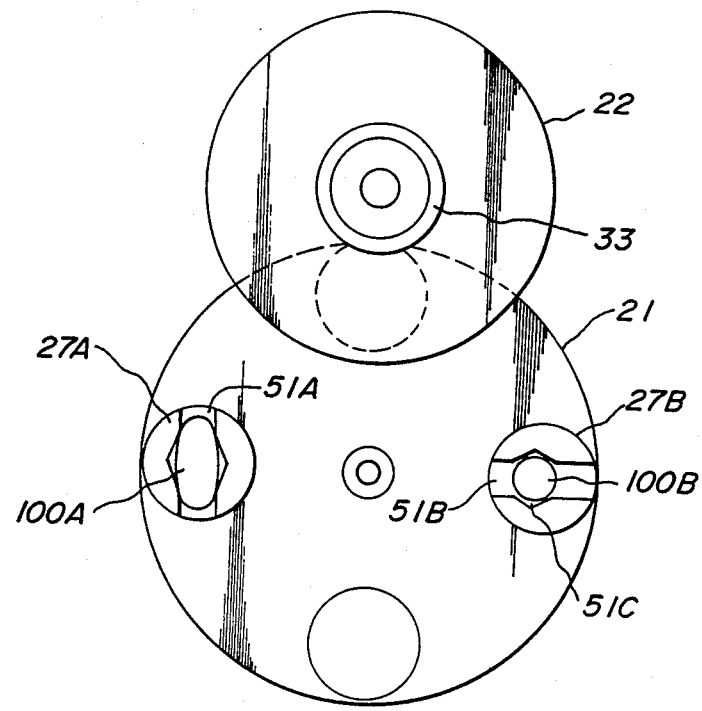
FIG. 6 is a plan view illustrating one example of contour of a chuck used in the device according to the invention.

If the honeycomb structure is ground under a stationary condition, its ground surface tends to tilt. To avoid this, the honeycomb structure is ground while being rotated, thereby obtaining uniform ground surfaces. In this case, moreover, the springs $S_p$ below the chuck 27 embracing the honeycomb structure 100 serve with their elasticity to prevent abrupt change in grinding pressure due to unevenness of the end surface of the honeycomb structure 100. The chuck 27 is shaped corresponding to the contour of the honeycomb structure so as not to permit the base 26 to rotate relative to the honeycomb structure. In more detail, as shown in FIG. 6, the chuck 27A for embracing the substantially elongated honeycomb structure 100A is formed with a groove 51A extending along its one diameter and having a rhombic recess at its center. When the honeycomb structure 100A is arranged in the groove 51A, the center of the honeycomb structure 100A coincides with the rotating center of the base 26.

For locating a honeycomb structure 100B having a circular cross-section, a chuck 27B is formed with a groove 51B extending along its one diameter and having a widened recess 51C or rhombic recess somewhat shifted from the rotating center of the base 26 along the groove 51B. If the widened recess 51C were coincident with the rotating center of the base 26, there would be a risk of the circular cross-sectional honeycomb structure 100B being slidingly rotated in the widened recess 51C. Such a problem can be solved by shifting the center of the honeycomb structure 100B relative to the rotating center of the base 26 as above described.

When the grinding of the end surface of the honeycomb structure 100 has been finished, the cup raising cylinder 23 is actuated in the reverse direction so as to lower the cup 25 to return the base 26 onto the turntable 21. At the moment when the base 26 seats on the turntable 21, the cup rotating motor 24 is deenergized. In this case, the ground honeycomb structure is stopped so that its longitudinal axis (in case of elongated sectional honeycomb structure) is coincident with a radial direction of the turntable 21 as shown in FIG. 2. With this arrangement, all the ground honeycomb structures are transferred and loaded by the device so as to be oriented in the same directions.

In this manner, the ground honeycomb structures 101 are fed to the position in the transferring and loading device as above described by the rotation of the turntable 21.

The transferring and loading device above described can of course be utilized not only for transferring and loading the honeycomb structures 101 after their end surfaces have been ground but also for other processes.

As can be seen from the above description, the transferring and loading device according to the invention comprises the suction duct having a movable arm provided at its end with the perforated suction plate against which open ends of honeycomb structures abut, thereby making the honeycomb structure cling to the perforated plate with the aid of suction force caused by exhaust air in an amount larger than the amount of suction air passing through passages of the honeycomb structure and at the same time removing (by suction) dust or ground chips attached to the passages and outer surfaces of the honeycomb structure produced in grinding its end surface. Accordingly, the apparatus according to the invention can handle the honeycomb structures rapidly without applying undue forces to the honeycomb structures and can remove the ground chips simultaneously. In this manner, the device according to the invention can handle the honeycomb structures completely preventing them from being damaged with high operating efficiency and enables the honeycomb structures to be manufactured in mass-production. Moreover, as the device also has the dust sucking performance, which eliminates a different dust collecting operation for honeycomb structures to reduce the processes for production.

It is further understood by those skilled in the art that the foregoing description is that of preferred embodiments of the disclosed devices and that various changes and modifications may be made in the invention without departing from the spirit and scope thereof.

What is claimed is:

1. A transferring and loading device for honeycomb structures, comprising:
   a rotating base member;
   a movable hollow arm, said movable arm having a suction duct in communication with a suction means at a first end of the movable hollow arm;
   a perforated plate secured to a second end of said movable hollow arm, wherein said perforated plate contacts a honeycomb structure whose open end abuts against the perforated plate;
   a cup raising cylinder for raising a cup-shaped article, said cup raising cylinder located below said rotating base member on which a honeycomb structure is located, whereby said cup raising cylinder places the honeycomb structure into abutted contact with the perforated plate;
   a chuck arranged above said cup-shaped article for holding the honeycomb structure, said chuck including a bottom perforated plate and a plurality of springs interposed between said chuck and said rotating base member, thereby forming a gap between said rotating base member and said chuck;
   a suctions means for sucking atmospheric air into said suction duct through said bottom perforated plate, passages in the honeycomb structure, and the perforated plate of the movable arm, thereby causing the honeycomb structure to cling to the perforated plate of the movable arm; and
   a movable arm driving means for rotating said movable arm between at least two predetermined positions.

2. A device as set forth in claim 1, wherein said chuck is formed with a groove extending along its one diameter and having a rhombic recess at its center such that when the honeycomb structure is arranged in the chuck a center of an elongated honeycomb structure coincides with a rotating center of the base.

3. A device as set forth in claim 1, wherein said chuck is formed with a groove extending along its one diameter and having a widened recess somewhat shifted from a rotating center of the base along the groove.

4. A device as set forth in claim 1, wherein said rotating base member comprises a turntable rotatable in increments of a predetermined angle, said device further comprising a supply station having a stocker for accomodating therein a plurality of laminated honeycomb structures for locating them sequentially onto a base, said transferring and loading device being in communication with a grinding device for grinding an end surface of the honeycomb structures fed from said supply station by rotation of said turntable.

* * * * *